(12) United States Patent
Su et al.

(10) Patent No.: US 11,728,966 B2
(45) Date of Patent: Aug. 15, 2023

(54) METHOD OF CONSTRUCTING A SEMI-PUBLIC KEY SYSTEM IN QAP-BASED HOMOMORPHIC ENCRYPTION

(71) Applicant: National Applied Research Laboratories, Hsinchu (TW)

(72) Inventors: Zheng-Yao Su, Hsinchu (TW); Ming-Chung Tsai, Hsinchu (TW)

(73) Assignee: National Applied Research Laboratories, Hsinchu (TW)

( * ) Notice: Subject to any disclaimer, the term of this patent is extended or adjusted under 35 U.S.C. 154(b) by 52 days.

(21) Appl. No.: 17/547,570

(22) Filed: Dec. 10, 2021

(65) Prior Publication Data

US 2023/0128727 A1  Apr. 27, 2023

Related U.S. Application Data

(60) Provisional application No. 63/270,633, filed on Oct. 22, 2021.

(30) Foreign Application Priority Data

Nov. 11, 2021 (TW) ................. 110142066

(51) Int. Cl.
*H04L 9/00* (2022.01)
*H04L 9/08* (2006.01)

(52) U.S. Cl.
CPC ............ *H04L 9/008* (2013.01); *H04L 9/0869* (2013.01); *H04L 2209/34* (2013.01)

(58) Field of Classification Search
CPC ... H04L 9/008; H04L 9/0869; H04L 2209/34; H04L 9/00; H04L 9/08
See application file for complete search history.

(56) References Cited

U.S. PATENT DOCUMENTS

2005/0152538 A1* 7/2005 Stedron ............... G09C 1/02
380/28
2020/0136797 A1* 4/2020 Yu ......................... H04L 9/008

* cited by examiner

*Primary Examiner* — Quazi Farooqui
(74) *Attorney, Agent, or Firm* — Amin, Turocy & Watson, LLP

(57) ABSTRACT

The method of constructing QAP-based Homomorphic Encryption (HE) in the semi-public setting is introduced, which comprises: encryption, computation, and decryption. The data receiver produces a semi-public key $Key_{s\text{-}pub}$. The data provider can encode his k-qubit plaintext $|x\rangle$ to a k-qubit ciphertext $|\psi_{en}\rangle = Q_P|x\rangle$ via a k-qubit invertible operator $Q_P$ randomly generated by $Key_{s\text{-}pub}$. From the provider, the message $En(\zeta_P)$ of $Q_P$ encoded by a cryptosystem $G_{crypt}$ in $Key_{s\text{-}pub}$ is transmitted to the receiver through a small-resource communication channel and the ciphertext $|\psi_{en}\rangle$ is conveyed to the cloud. The receiver creates the instruction of encoded computation $U_{en} = P\mathcal{A}MQ_P$ and transports to the cloud, where M is the required k-qubit arithmetic operation, P a k-qubit permutation, and $\mathcal{A}$ a k-qubit operator to mingle with M. According the instruction, the cloud performs the encrypted evaluation $U_{en}|\psi_{en}\rangle$ and transfer to the receiver. The decryption $Key_{priv} U_{en}|\psi_{en}\rangle$ is conducted by the receiver via the private key $Key_{priv} = \mathcal{A}^\dagger P^\dagger$, a complex-transpose of the product $P\mathcal{A}$, to obtain the final result $M|x\rangle$.

1 Claim, 2 Drawing Sheets

METHOD OF CONSTRUCTING A SEMI-PUBLIC KEY SYSTEM IN QAP-BASED HOMOMORPHIC ENCRYPTION

RELATED APPLICATIONS

The present application claims the priority of U.S. Provisional Patent Application No. 63/270,633, the disclosure of which is hereby incorporated by reference herein in its entirety.

BACKGROUND OF THE INVENTION

1. Field of the Invention

The present disclosure generally relates to a method of constructing a semi-public key system, particularly, to a method of constructing a semi-public key system in quotient algebra partition (QAP)-based homomorphic encryption (HE).

2. Description of the Related Art

Due to the advancement of science and technology and the development of the industry, especially, the advent of the digital age, any plaintext on the internet is desired to be transferred as a completely encrypted state, to be decrypted securely, and moreover to be proceed in an encrypted state. However, current schemes of homomorphic encryption (HE) are built on the so-called lattice-based cryptography, a class of post-quantum cryptosystems allowing to prevent data from attacks of quantum algorithms A proportion of noises would occur in every step of computation for the encryption. It is required to reduce the effect of the noise to avoid computational errors. In other words, the computation process leads to approximated solutions as an approximation and an exponential overhead of computation is needed to reduce noises during the process. The current achievement of homomorphic encryption are quite limited and the algorithms and the operators computed in the homomorphic encryption would be revealed during the homomorphic encryption. It is a research direction for researchers that how to provide exact solutions instead of approximated ones, conduct blind evaluations without secret disclosures, and allowing problem-dependent optimizations with modest overheads to improve the speed and security in encrypted computation.

Accordingly, inventors of the present inventive concept conduct a deep discussion on the aforementioned requirement based on his research experiments in the related fields and seek for a solutions actively. After a long time research and multiple tests, the inventor finally accomplishes the present invention without conventional shortcomings of the prior art and improve the progress and practicality.

SUMMARY OF THE INVENTION

In light of solving the foregoing problems of the prior art, the present inventive concept provides a method of constructing a semi-public key system in quotient algebra partition (QAP)-based homomorphic encryption (HE). The schemes of homomorphic encryption are constructed and computed in the framework QAP. A plaintext would be encoded into a ciphertext of the same length; arithmetic operation would be encoded, such that the whole homomorphic encryption computation process would achieve as a blind computation. Besides, the method would provide exact solutions instead of approximated ones with modest overheads and allow a small resource of communication between the data provider and the data receiver to improve the encryption security.

The present inventive concept further provides a method of constructing a semi-public key system in QAP-based homomorphic encryption to provide an exact solutions rather than approximated ones. It allows applications of delicately-designed invertible gates including spinor, CNOT, Toffoli gate, SWAP, Controlled SEAP, Multi-Control Gate in Hilbert space to conduct homomorphic encryption computations, which are built through a small-resource communication channel between the date provider and the data receiver.

The present inventive concept further provides a method of constructing a semi-public key system in QAP-based homomorphic encryption. It conducts encoded arithmetic operation and the operators are arranged to attain the design of one-way function as fully blind operators.

The present inventive concept further provides a method of constructing a semi-public key system in QAP-based homomorphic encryption. In the present inventive concept, unlike to the public-key scheme of QAPHE containing the process of error-correction, an overhead of error-correction is not necessary and thereby lowering the computational cost.

The present inventive concept further provides a method of constructing a semi-public key system in QAP-based homomorphic encryption which is enable to allow problem-dependent optimizations with modest overheads.

The method of the present inventive concept comprises:

S1. encryption: comprising key generation and encoding;

S11. key generation: a data receiver generates a semi-public key, $\text{Key}_{s\text{-}pup}$, and a private key, $\text{Key}_{priv}$.

In an embodiment of the present inventive concept, the semi-public key $\text{Key}_{priv}$, randomly generates an arbitrary k-qubit operation from a gigantic number of invertible gates of the same qubits; the private key, $\text{Key}_{priv}$, for decryption is represented by $\text{Key}_{priv} = \mathcal{A}^\dagger P^\dagger$, which is a product of two k-qubit operators, $\mathcal{A}^\dagger$ and $P^\dagger$; wherein the semi-public key, $\text{Key}_{s\text{-}pup}$, is published in public space to transforming a plaintext to a ciphertext by anyone; and the private key, $\text{Key}_{priv}$, is retained by the data receiver to decrypt the encrypted ciphertext.

The method of the present inventive concept further comprises:

S12. encoding: data provider provides a k-qubit plaintext, $|x\rangle$, a random k-qubit operation $Q_p$ generated by the semi-public key, $\text{Key}_{s\text{-}pub}$, for example, a random k-qubit permutations, a ciphertext $|\psi_{en}\rangle = Q_p|x\rangle$ with the same qubit length is obtained; the semi-public key, $\text{Key}_{s\text{-}pub}$, also encodes a binary string $\zeta_p$, which is 1-to-1 correspondence to $Q_p$ according to a given code system $G_{crypt}$, into an encrypted message $\text{En}(\zeta_p)$ and sends it to the data receiver through a communication channel of small resource; and a data provider sends the cipher $|\psi_{en}\rangle$ to a computation provider.

The method of the present inventive concept further comprises:

S2. Computation:

S21. a k-qubit arithmetic operation M is given to be operated and output a homomorphic encryption operation $U_{en}$ enable to be conducted on the encrypted state $|\psi_{en}\rangle$; after receiving the encrypted message $\text{En}(\zeta_p)$ from the data provider and obtaining the corresponding k-qubit operation $Q_p$ by the decryption process in $G_{crypt}$, the data receiver produces a computational instructions of the homomorphic encryption operation $U_{en}$ with a form:

$$U_{en} = P\mathcal{A}MQ_p^\dagger$$

$$= (P_1^\dagger W_1^\dagger \mathcal{A} M W_1 P_1)(P_1^\dagger P_0)(P_0^\dagger W_2)$$

Where $Q_p^\dagger = W_1 W_2$ is a product of a qubit permutation $W_1$ and an operation $W_2$ comprising elementary gates (CNOTs, SWAPs, Toffolis, CSWAPs), $P_{j=0,1}$ and P are qubit permutations following the nilpotent condition $PW_1P_1=I_{2^n}$ and S22. the computation provider receives the computational instructions to computes $U_{en}|\psi_{en}\rangle$ and an encrypted evaluation is obtained.

The method of the present inventive concept further comprises: S3. Decryption:

The computation provider conducts a homomorphic encryption computation $U_{en}|\psi_{en}\rangle$ and sends the encrypted evaluation to the data receiver; the data receiver decrypts the evaluation by applying the private key $Key_{priv}=\mathcal{A}^\dagger P^\dagger$ to the state $U_{en}|\psi_{en}\rangle$, which is written as $\mathcal{A}^\dagger P^\dagger U_{en}|\psi_{en}\rangle = M|x\rangle$, and then obtains the result $M|x\rangle$.

DETAILED DESCRIPTION

The present inventive concept is described by the following specific embodiments. Those with ordinary skills in the arts can readily understand other advantages and functions of the present inventive concept after reading the disclosure of this specification. Any changes or adjustments made to their relative relationships, without modifying the substantial technical contents, are also to be construed as within the range implementable by the present inventive concept.

Moreover, the word "exemplary" or "embodiment" is used herein to mean serving as an example, instance, or illustration. Any aspect or design described herein as exemplary or an embodiment is not necessarily to be construed as preferred or advantageous over other aspects or designs. Rather, use of the word "exemplary" or "embodiment" is intended to present concepts and techniques in a concrete fashion.

As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more," unless specified otherwise or clear from context to be directed to a singular form.

Figure 1:
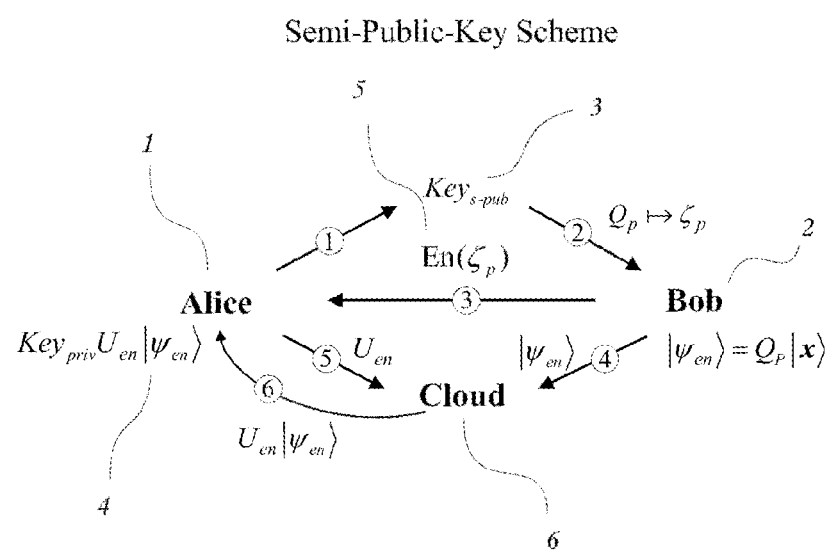
FIG. 1 is a flow chart of actual operation for encryption, computation and decryption according to the present inventive concept.

Please refer to FIG. 1. The present inventive concept provides a method of constructing a semi-public key system in Quotient Algebra Partition (QAP)-based homomorphic encryption (HE), by an algebraic structure, QAP, and an arithmetic operation of homomorphic encryption. The Encryption, computation and decryption are computed in the framework of QAP by QAP-based fault tolerance quantum computation in an algebraic structure of QAP.

The method of the present inventive concept comprises:
S1. encryption: comprising S11. key generation and S12. encoding by a data receiver (Alice). In step S11. key generation, Alice generates a semi-public key, $Key_{s\text{-}pub}$ (3) for encryption and a private key, $Key_{priv}$ (4) for decryption, wherein the semi-public key $Key_{priv}$ may randomly generate an arbitrary k-qubit operation chosen from a gigantic number of invertible gates of the same qubits. For instance, the private key $Key_{priv}$ can be chosen as a key to randomly provide an arbitrary element from a number $k! = 1 \times 2 \times \ldots \times k$ of k-qubit permutations. The private key, $Key_{priv}$, for decryption may be represented by $Key_{priv}=\mathcal{A}^\dagger P^\dagger$, which is a product of two n-qubit operators, $\mathcal{A}^\dagger$ and $P^\dagger$. The semi-public key, $Key_{s\text{-}pub}$, may be published in public space to transforming a plaintext to a ciphertext by anyone; and the private key, $Key_{priv}$, is retained by Alice to decrypt the encrypted ciphertext. In the Step S12 encoding, a data provider (Bob) provides k-qubit plaintext, $|x\rangle$, for the homomorphic encryption computation by the k-qubit qubit permutation generated by the semi-public key, $Key_{priv}$, and an encoded state of ciphertext $|\psi_{en}\rangle = Q_p|x\rangle$ with the same qubit length is obtained, which means a ciphertext with the same length as the plaintext would be obtained, rather than a longer length ciphertext, as shown in ② in FIG. 1. Because error-corrections are not necessary, and thereby the encryption time is shorter, the security is higher based on the same security level and same plaintext. The semi-public key, $Key_{s\text{-}pub}$ (3) encodes a binary string $\zeta_p$ which is 1-to-1 correspondence to $Q_p$ according to a given code system, $G_{crypt}$ (for example, any post-quantum code system may be given) into an encrypted message $En(\zeta_p)$ and sends it to Alice (1) (please refer to ③ in FIG. 1). Bob (2) sends the cipher $|\psi_{en}\rangle$ to a computation provider (Cloud) (6) (please refer to ④ in FIG. 1). This step allows a small resource of communication between Bob (2) and Alice (1), which means the semi-public key, $Key_{s\text{-}pub}$ (3) is enable to send any qubit permutation $Q_p$ and its encoded encrypted message $En(\zeta_p)$ (5) to Alice (1) at the same time.

According to an embodiment of the present inventive concept, the method may comprise step S2. Computation. A k-qubit arithmetic operation M is given to be operated and output a homomorphic encryption operation $U_{en}$ enable to be conducted on the encrypted state $|\psi_{en}\rangle$; after receiving the encrypted message $En(\zeta_p)$ corresponding to the qubit permutation $Q_p$, from Bob, Alice (1) may produce a computational instructions of the homomorphic encryption operation $U_{en}$ with a form:

$$U_{en}=P\mathcal{A} MQ_p^\dagger = (P_1^\dagger W_1^\dagger \mathcal{A}\ M\ W_1 P_1)(P_1^\dagger P_0)(P_0^\dagger W_2),$$

where $Q_p^\dagger = W_1 W_2$, which is a product of a qubit permutation $W_1$ and an operation $W_2$ comprising elementary gates (Spinors, CNOTs, Toffolis, SWAPs, Controlled SWAP, Multi-Control Gate), and $P_{j=0,1}$ and P are qubit permutations and follow $PW_1P_1=I_{2^n}$.

In an embodiment of the present inventive concept, Alice (1) may decrypt and recover the encrypted message $En(\zeta_p)$ to the original $Q_p$ and encodes $Q_p$ into the computational instruction $U_{en}$ and sends to the Cloud (6) (please refer to ⑤ in FIG. 1). The Cloud (6) may further receive a computational instructions to computes $U_{en}|\psi_{en}\rangle$.

According to an embodiment of the present inventive concept, the method may comprise step S3. Decryption. The Cloud (6) conducts the homomorphic encryption computation $U_{en}|\psi_{en}\rangle$ and sends the encrypted results to Alice (1)

(please refer to ⑥ in FIG. 1). Alice (1) decrypts the results by applying the private key, $\text{Key}_{priv}=\mathcal{A}^\dagger P^\dagger$ to the state $U_{en}|\psi_{en}\rangle$, which is written as $\mathcal{A}^\dagger P^\dagger U_{en}|\psi_{en}\rangle = M|x\rangle$, and then obtains the result $M|x\rangle$.

Figure 2:
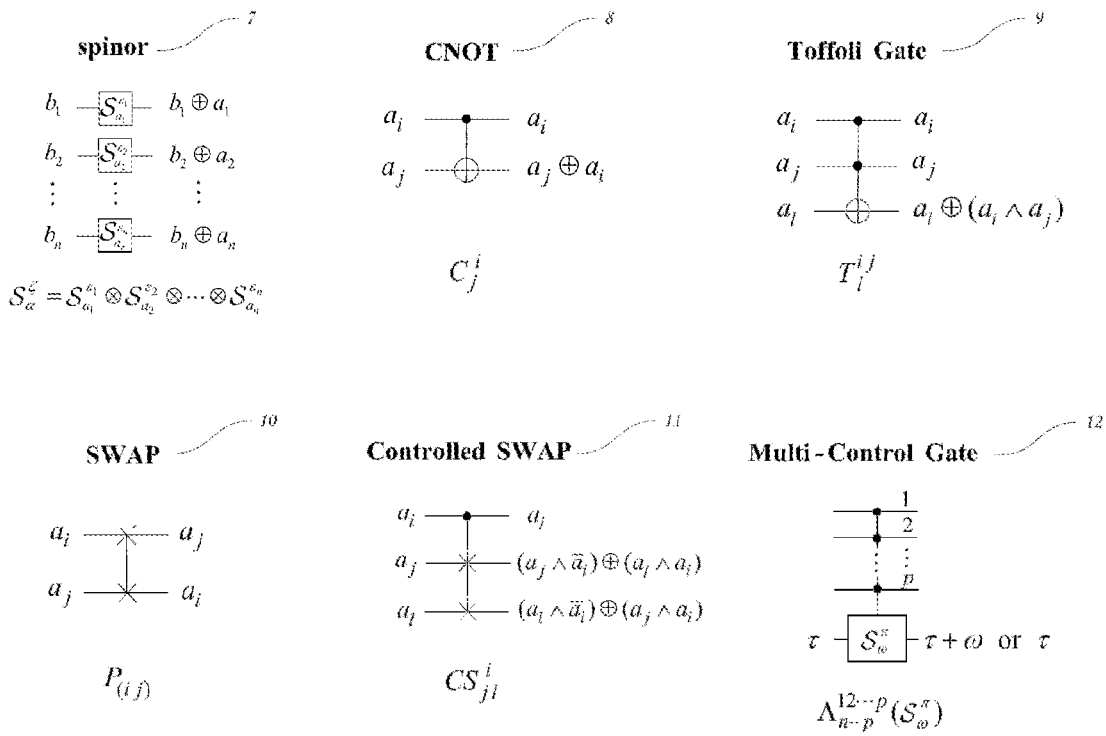
FIG. 2 is a schematic diagram of the elementary gates used in the algorithm according to the present inventive concept.

Please refer to FIG. 2 which is a schematic diagram of the elementary gates used in the algorithm according to the present inventive concept. According to the present inventive concept, the spinor (7) is an n-qubit spinor $\mathcal{S}_a^\zeta = \mathcal{S}_{a_1}^{\varepsilon_1} \otimes \mathcal{S}_{a_2}^{\varepsilon_2} \otimes \ldots \otimes \mathcal{S}_{a_n}^{\varepsilon_n}$, which is composed of a tensor product of n spinors, with $\zeta$, $\alpha \in Z_2^n$ and $\varepsilon_j$, $a_j \in Z_2$. Each of the spinors $\mathcal{S}_{a_j}^{\varepsilon_j}$, $1 \leq j \leq n$, may be represented as a 2×2 matrix. The spinor $\mathcal{S}_{a_j}^{\varepsilon_j}$ may transform a single-bit string $b_j$ into $b_j \oplus a_j$, where $\oplus$ means a logical XOR operation, i.e. $0 \oplus 0 = 0 = 1 \oplus 1$, $0 \oplus 1 = 1 = 1 \oplus 0$.

According to the present inventive concept, CNOT (8) is a binary logic gate operation. A binary string, $a_i a_j$, is given, where $a_i$ is a control bit and $a_j$ is a target bit. $a_i$ remain the same and $a_j$ is transformed into $a_j \oplus a_i$ for the CNOT operation performing on $a_i a_j$.

According to the present inventive concept, Toffoli gate (9) is a trinary logic gate operation. A trinary string, $a_i a_j a_l$, is given, where $a_i$ and $a_j$ are control bits and $a_l$ is a target bit. $a_i$ and $a_j$ remain the same and $a_l$ is transformed into $=a_l \oplus (a_i \wedge a_j)$ for the Toffoli gate operation performing on $a_i a_j a_l$, where $\wedge$ means a logical AND operation.

According to the present inventive concept, SWAP (10) is a binary logic gate operation. A binary string, $a_i a_j$, is given. The SWAP gate swaps the qubits, $a_i$ and $a_j$, to generate a string $a_j a_i$.

According to the present inventive concept, CSWAP (Controlled SWAP) (11) is a trinary logic gate operation. A trinary string, $a_i a_j a_l$ is given, where $a_i$ is a control bit and $a_j$ and $a_l$ is target bits. $a_i$ remains the same and $a_j$ is transformed into $(a_j \wedge \bar{a}_i) \oplus (a_j \wedge a_i)$, $a_l$ is transformed into $(a_l \wedge \bar{a}_i) \oplus (a_j \wedge a_i)$ for the CSWAP operation on $a_i a_j a_l$, where $\bar{a}_i$ is a negation of the original bit $a_i$, e.g. $\bar{0}=1$, $\bar{1}=0$.

According to the present inventive concept, Multi-Control gate (12) is a n-nary logical gate operation. A n-bit string, $a_1 a_2 \ldots a_p a_{p+1} \ldots a_n$, is given. Performing a multi-control p-gate $\wedge_{n-p}^{p/2 \ldots p}(\mathcal{S}_\omega^\pi)$, if the first p-bit $a_1=a_2=\ldots=a_p=1$, the last (n-p)-bits are effected by the spinor $\mathcal{S}_\omega^\pi$; otherwise the n-bit string remains the same.

According to the present inventive concept, the method of constructing a semi-public key system in QAP-based homomorphic encryption of the present inventive concept is a method of fault tolerance quantum computation in QAP by an algebraic structure, QAP, and an arithmetic operation of homomorphic encryption. The fully homomorphic encryption is naturally achieved in either scheme through delicately-designed invertible gates, acting on the Hilbert space and thereby the present inventive concept may provide an exact solutions rather than approximated ones. It conducts encoded arithmetic operation and the operators are fully blind operators and allows problem-dependent optimizations. The present inventive concept allows a communication channel to be built between the data receiver and the data provider with low cost, to improve the encryption efficiency and security and lower the computation cost. Besides, the ciphertext has the same length during the encryption, so an overhead of error-correction is not necessary in homomorphic encryption computation and thereby it may lower the computational cost.

In summary, the method of constructing a semi-public key system in QAP-based homomorphic encryption of the present inventive concept allows so-called Homomorphic Encryption to be conducted with a small resource of communication between the data provider and the data receiver during encryption without secret disclosures. The encrypted ciphertext has the same length without errors. Thereby the encryption time is shorter, the security is higher based on the same security level and same plaintext and the method allows problem-dependent optimizations with modest overheads.

The foregoing descriptions of the detailed embodiments are only illustrated to disclose the features and functions of the present inventive concept and not restrictive of the scope of the present inventive concept. It should be understood to those in the art that all modifications and variations according to the spirit and principle in the disclosure of the present inventive concept should fall within the scope of the appended claims.

What is claimed is:

1. A method of constructing a semi-public key system in Quotient Algebra Partition (QAP)-based homomorphic encryption (HE), by an algebraic structure, QAP, and an arithmetic operation of homomorphic encryption, wherein the method comprises:

S1: encryption: comprising key generation and encoding;

S11: key generation: a data receiver generates a semi-public key, $\text{Key}_{s-pub}$, and a private key, $\text{Key}_{priv}$;

wherein the semi-public key $\text{Key}_{s-pub}$, randomly generates an arbitrary k-qubit operation from a gigantic number of invertible gates of the same qubits;

the private key, $\text{Key}_{priv}$, for decryption is represented by $\text{Key}_{priv} = \mathcal{A}^\dagger P^\dagger$, which is a product of two k-qubit operators, $\mathcal{A}^\dagger$ and $P^\dagger$; wherein the semi-public key, $\text{Key}_{s-pub}$, is published in public space to transforming a plaintext to a ciphertext by anyone; and the private key, $\text{Key}_{priv}$, is retained by the data receiver to decrypt the encrypted ciphertext;

S12: encoding: a data provider provides a k-qubit plaintext, $|x\rangle$, a k-qubit operation $Q_p$ generated by the semi-public key, $\text{Key}_{s-pub}$; an encoded state of ciphertext $|\psi_{en}\rangle = Q_p|x\rangle$ with the same qubit length is obtained; the semi-public key, $\text{Key}_{s-pub}$, encodes a binary string $\zeta_p$, which is 1-to-1 correspondence to $Q_p$ according to a given code system $G_{crypt}$, into an encrypted message $\text{En}(\zeta_p)$ and sends it to the data receiver through a communication channel of small resource; and the data provider sends the ciphertext $|\psi_{en}\rangle$ to a computation provider;

S2: Computation:

S21: a k-qubit arithmetic operation M is given to be operated and output a homomorphic encryption operation $U_{en}$ enable to be conducted on the encrypted state $|\psi_{en}\rangle$; after receiving the encrypted message $\text{En}(\zeta_p)$ from the data provider and obtaining the corresponding k-qubit operation $Q_p$ by the decryption process in $G_{crypt}$, the data receiver produces a computational instructions of the homomorphic encryption operation $U_{en}$ with a form:

$$U_{en} = P\mathcal{A}MQ_p^\dagger$$
$$= (P_1^\dagger W_1^\dagger \mathcal{A} M W_1 P_1)(P_1^\dagger P_0)(P_0^\dagger W_2)$$

where $Q_P^\dagger = W_1 W_2$ is a product of a qubit permutation $W_1$ and an operation $W_2$ comprising of elementary gates (CNOTs, SWAPs, Toffolis, CSWAPs), $P_{j=0,1}$ and P are qubit permutations following the nilpotent condition $PW_1P_1 = I_{2^n}$, and then sends $U_{en}$ to the computation provider;

S22: the computation provider receives the computational instructions to computes $U_{en}|\psi_{en}\rangle$ and an encrypted evaluation is obtained;

S3: Decryption:

the computation provider conducts homomorphic encryption computation $U_{en}|\psi_{en}\rangle$ and sends the encrypted evaluation to the data receiver; the data receiver decrypts the evaluation by applying the private key $Key_{priv}=\mathcal{A}^{\dagger}P^{\dagger}$ to the state $U_{en}|\psi_{en}\rangle$, which is written as $\mathcal{A}^{\dagger}P^{\dagger}U_{en}|\psi_{en}\rangle=M|x\rangle$, and then obtains the unencoded result $M|x\rangle$.

* * * * *